(12) United States Patent
Wilding

(10) Patent No.: US 12,287,716 B2
(45) Date of Patent: *Apr. 29, 2025

(54) TECHNIQUES FOR PROVIDING APPLICATION CONTEXTUAL INFORMATION

(71) Applicant: Salesforce, Inc., San Francisco, CA (US)

(72) Inventor: Mark Wilding, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,570

(22) Filed: Feb. 16, 2024

(65) Prior Publication Data
US 2024/0193063 A1     Jun. 13, 2024

Related U.S. Application Data

(63) Continuation of application No. 17/334,565, filed on May 28, 2021, now Pat. No. 11,940,893, which is a continuation of application No. 16/673,773, filed on Nov. 4, 2019, now Pat. No. 11,023,346, which is a continuation of application No. 15/421,354, filed on Jan. 31, 2017, now Pat. No. 10,467,117.

(51) Int. Cl.
| | | |
|---|---|---|
| G06F 11/00 | (2006.01) | |
| G06F 11/07 | (2006.01) | |
| G06F 11/30 | (2006.01) | |
| G06F 11/34 | (2006.01) | |

(52) U.S. Cl.
CPC ...... *G06F 11/3075* (2013.01); *G06F 11/0778* (2013.01); *G06F 11/0784* (2013.01); *G06F 11/302* (2013.01); *G06F 11/3476* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |

(Continued)

OTHER PUBLICATIONS

Google Scholar/Patents search—text refined (Year: 2024).*

(Continued)

*Primary Examiner* — Christopher S McCarthy
(74) *Attorney, Agent, or Firm* — Kwan & Olynick LLP

(57) ABSTRACT

Techniques for providing application contextual information. One or more sets of database context identifiers corresponding to events that occur within the database are generated by the database. The one or more sets of database context identifiers have at least one application context field. A session identifier corresponding to a session to be monitored is sent from the application to the database. Information to be stored in the database with the session identifier is sent to the database. Database logs and application logs are correlated using at least the session identifier.

20 Claims, 10 Drawing Sheets

(56) References Cited

U.S. PATENT DOCUMENTS

| | | | |
|---|---|---|---|
| 5,821,937 | A | 10/1998 | Tonelli |
| 5,831,610 | A | 11/1998 | Tonelli |
| 5,873,096 | A | 2/1999 | Lim |
| 5,918,159 | A | 6/1999 | Fomukong |
| 5,963,953 | A | 10/1999 | Cram |
| 6,092,083 | A | 7/2000 | Brodersen |
| 6,169,534 | B1 | 1/2001 | Raffel |
| 6,178,425 | B1 | 1/2001 | Brodersen |
| 6,189,011 | B1 | 2/2001 | Lim |
| 6,216,135 | B1 | 4/2001 | Brodersen |
| 6,233,617 | B1 | 5/2001 | Rothwein |
| 6,266,669 | B1 | 7/2001 | Brodersen |
| 6,295,530 | B1 | 9/2001 | Ritchie |
| 6,324,568 | B1 | 11/2001 | Diec |
| 6,324,693 | B1 | 11/2001 | Brodersen |
| 6,336,137 | B1 | 1/2002 | Lee |
| D454,139 | S | 3/2002 | Feldcamp |
| 6,367,077 | B1 | 4/2002 | Brodersen |
| 6,393,605 | B1 | 5/2002 | Loomans |
| 6,405,220 | B1 | 6/2002 | Brodersen |
| 6,434,550 | B1 | 8/2002 | Warner |
| 6,446,089 | B1 | 9/2002 | Brodersen |
| 6,535,909 | B1 | 3/2003 | Rust |
| 6,549,908 | B1 | 4/2003 | Loomans |
| 6,553,563 | B2 | 4/2003 | Ambrose |
| 6,560,461 | B1 | 5/2003 | Fomukong |
| 6,574,635 | B2 | 6/2003 | Stauber |
| 6,577,726 | B1 | 6/2003 | Huang |
| 6,601,087 | B1 | 7/2003 | Zhu |
| 6,604,117 | B2 | 8/2003 | Lim |
| 6,604,128 | B2 | 8/2003 | Diec |
| 6,609,150 | B2 | 8/2003 | Lee |
| 6,621,834 | B1 | 9/2003 | Scherpbier |
| 6,654,032 | B1 | 11/2003 | Zhu |
| 6,665,648 | B2 | 12/2003 | Brodersen |
| 6,665,655 | B1 | 12/2003 | Warner |
| 6,684,438 | B2 | 2/2004 | Brodersen |
| 6,711,565 | B1 | 3/2004 | Subramaniam |
| 6,724,399 | B1 | 4/2004 | Katchour |
| 6,728,702 | B1 | 4/2004 | Subramaniam |
| 6,728,960 | B1 | 4/2004 | Loomans |
| 6,732,095 | B1 | 5/2004 | Warshavsky |
| 6,732,100 | B1 | 5/2004 | Brodersen |
| 6,732,111 | B2 | 5/2004 | Brodersen |
| 6,754,681 | B2 | 6/2004 | Brodersen |
| 6,763,351 | B1 | 7/2004 | Subramaniam |
| 6,763,501 | B1 | 7/2004 | Zhu |
| 6,768,904 | B2 | 7/2004 | Kim |
| 6,782,383 | B2 | 8/2004 | Subramaniam |
| 6,804,330 | B1 | 10/2004 | Jones |
| 6,826,565 | B2 | 11/2004 | Ritchie |
| 6,826,582 | B1 | 11/2004 | Chatterjee |
| 6,826,745 | B2 | 11/2004 | Coker |
| 6,829,655 | B1 | 12/2004 | Huang |
| 6,842,748 | B1 | 1/2005 | Warner |
| 6,850,895 | B2 | 2/2005 | Brodersen |
| 6,850,949 | B2 | 2/2005 | Warner |
| 7,289,976 | B2 | 10/2007 | Kihneman |
| 7,340,411 | B2 | 3/2008 | Cook |
| 7,620,655 | B2 | 11/2009 | Larsson |
| 7,779,021 | B1 | 8/2010 | Smith |
| 2001/0044791 | A1 | 11/2001 | Richter |
| 2002/0022986 | A1 | 2/2002 | Coker |
| 2002/0029161 | A1 | 3/2002 | Brodersen |
| 2002/0029376 | A1 | 3/2002 | Ambrose |
| 2002/0035577 | A1 | 3/2002 | Brodersen |
| 2002/0042264 | A1 | 4/2002 | Kim |
| 2002/0042843 | A1 | 4/2002 | Diec |
| 2002/0072951 | A1 | 6/2002 | Lee |
| 2002/0082892 | A1 | 6/2002 | Raffel |
| 2002/0129352 | A1 | 9/2002 | Brodersen |
| 2002/0140731 | A1 | 10/2002 | Subramaniam |
| 2002/0143997 | A1 | 10/2002 | Huang |
| 2002/0152102 | A1 | 10/2002 | Brodersen |
| 2002/0161734 | A1 | 10/2002 | Stauber |
| 2002/0162090 | A1 | 10/2002 | Parnell |
| 2002/0165742 | A1 | 11/2002 | Robins |
| 2003/0004971 | A1 | 1/2003 | Gong |
| 2003/0018705 | A1 | 1/2003 | Chen |
| 2003/0018830 | A1 | 1/2003 | Chen |
| 2003/0066031 | A1 | 4/2003 | Laane |
| 2003/0066032 | A1 | 4/2003 | Ramachandran |
| 2003/0069936 | A1 | 4/2003 | Warner |
| 2003/0070000 | A1 | 4/2003 | Coker |
| 2003/0070004 | A1 | 4/2003 | Mukundan |
| 2003/0070005 | A1 | 4/2003 | Mukundan |
| 2003/0074418 | A1 | 4/2003 | Coker |
| 2003/0088545 | A1 | 5/2003 | Subramaniam |
| 2003/0120675 | A1 | 6/2003 | Stauber |
| 2003/0151633 | A1 | 8/2003 | George |
| 2003/0159136 | A1 | 8/2003 | Huang |
| 2003/0187921 | A1 | 10/2003 | Diec |
| 2003/0189600 | A1 | 10/2003 | Gune |
| 2003/0191743 | A1 | 10/2003 | Brodersen |
| 2003/0204427 | A1 | 10/2003 | Gune |
| 2003/0206192 | A1 | 11/2003 | Chen |
| 2003/0225730 | A1 | 12/2003 | Warner |
| 2004/0001092 | A1 | 1/2004 | Rothwein |
| 2004/0010489 | A1 | 1/2004 | Rio |
| 2004/0015981 | A1 | 1/2004 | Coker |
| 2004/0027388 | A1 | 2/2004 | Berg |
| 2004/0128001 | A1 | 7/2004 | Levin |
| 2004/0186860 | A1 | 9/2004 | Lee |
| 2004/0193510 | A1 | 9/2004 | Catahan |
| 2004/0199489 | A1 | 10/2004 | Barnes-Leon |
| 2004/0199536 | A1 | 10/2004 | Barnes Leon |
| 2004/0199543 | A1 | 10/2004 | Braud |
| 2004/0249854 | A1 | 12/2004 | Barnes-Leon |
| 2004/0260534 | A1 | 12/2004 | Pak |
| 2004/0260659 | A1 | 12/2004 | Chan |
| 2004/0268299 | A1 | 12/2004 | Lei |
| 2005/0050555 | A1 | 3/2005 | Exley |
| 2005/0091098 | A1 | 4/2005 | Brodersen |
| 2009/0037492 | A1 | 2/2009 | Baitalmal |
| 2009/0106746 | A1 | 4/2009 | Chaudhuri |
| 2009/0177744 | A1 | 7/2009 | Marlow |
| 2011/0029665 | A1 | 2/2011 | Wenig |
| 2012/0150880 | A1 | 6/2012 | Ben-Natan |
| 2012/0239802 | A1 | 9/2012 | Kitamura |
| 2014/0032491 | A1 | 1/2014 | Neerincx |
| 2015/0067652 | A1 | 3/2015 | Seto |
| 2015/0067654 | A1 | 3/2015 | Seto |
| 2016/0266998 | A1 | 9/2016 | Gautallin |
| 2016/0344834 | A1 | 11/2016 | Das |
| 2017/0220610 | A1 | 8/2017 | Laethem |
| 2018/0246786 | A1 | 8/2018 | Armitage |
| 2019/0327154 | A1 | 10/2019 | Sahoo |

OTHER PUBLICATIONS

Final Office Action for U.S. Appl. No. 15/421,354 dated Apr. 19, 2019, 11 pages.

Non-Final Office Action for U.S. Appl. No. 15/421,354 dated Sep. 27, 2018, 9 pages.

Notice of Allowance for U.S. Appl. No. 15/421,354 dated Aug. 16, 2019, 8 pages.

Google Scholar/Patents search—text refined (Year: 2022).

Google Scholar/Patents search—text refined (Year: 2023).

Office Action (Non-Final Rejection) dated Feb. 22, 2023 for U.S. Appl. No. 17/334,565 (pp. 1-9).

Office Action (Final Rejection) dated Jul. 6, 2023 for U.S. Appl. No. 17/334,565 (pp. 1-9).

Office Action (Notice of Allowance and Fees Due (PTOL-85)) dated Nov. 20, 2023 for U.S. Appl. No. 17/334,565 (pp. 1-5).

\* cited by examiner

| Field | Description | State of usage in DB |
|---|---|---|
| RequestID | globally unique id for a given request | not used |
| ThreadID | App thread ID | used for DB process ID |
| ThreadName | | |
| Product Area | App product area exercised by the request | not used |
| Feature | App feature exercised by the request | not used |
| Action | Action performed by the request | not used |
| ObjectType | type of object manipulated or viewed by the request | not used |
| Org ID | tenant ID | not used |
| User ID | User of tenant | not used |
| URI | Page URI | not used |
| App IP address/port | IP address + port of app server (from TCP/IP layer) | Set by DB |
| Hostname | set by app server | |
| App name | Name of the client application | Used by DB, set via JDBC |
| Java stack | TBD | |
| Apex stack | TBD | |

FIG. 1

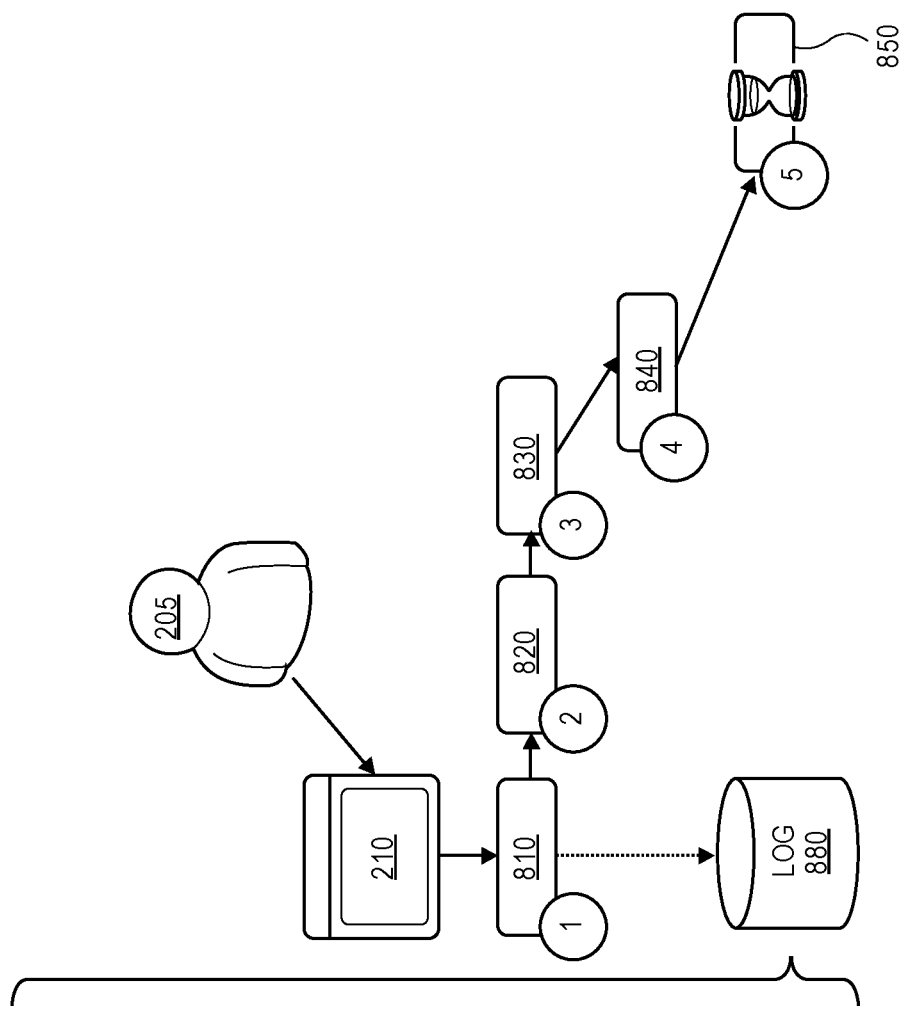
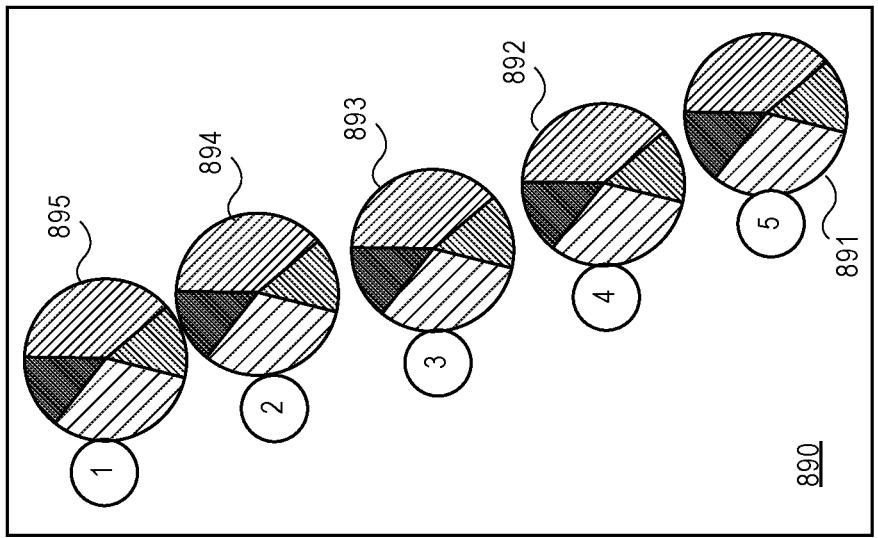
FIG. 8

TECHNIQUES FOR PROVIDING APPLICATION CONTEXTUAL INFORMATION

CLAIM OF PRIORITY

This application is a continuation of U.S. patent application Ser. No. 17/334,565, entitled "TECHNIQUES FOR PROVIDING APPLICATION CONTEXTUAL INFORMATION," filed May 28, 2021, which is a continuation of U.S. patent application Ser. No. 16/673,773, entitled "TECHNIQUES FOR PROVIDING APPLICATION CONTEXTUAL INFORMATION," filed Nov. 4, 2019, now U.S. Pat. No. 11,023,346 with an issue date of Jun. 1, 2021, which is a continuation of U.S. patent application Ser. No. 15/421,354, entitled "TECHNIQUES FOR PROVIDING APPLICATION CONTEXTUAL INFORMATION," filed Jan. 31, 2017, now U.S. Pat. No. 10,467,117 with an issue date of Nov. 5, 2019, the contents of which are incorporated herein by reference in their entirety.

TECHNICAL FIELD

Embodiments relate to diagnostics and monitoring within a database environment. More particularly, embodiments relate to providing application context information that can be used for diagnostics and monitoring purposes within the database environment.

BACKGROUND

Databases are utilized to store data for many different types and sizes of organizations. In the more sophisticated organizations, various applications can access the database. As the number and/or type of applications that access a database increase, so does the usefulness of monitoring and diagnostic functionality.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a conceptual illustration of one embodiment of a set of context identifiers that can be utilized for monitoring and/or diagnostics purposes.

FIG. 8 is a conceptual illustration of one embodiment of a technique for encapsulating time utilization information.

DETAILED DESCRIPTION

Figure 2:
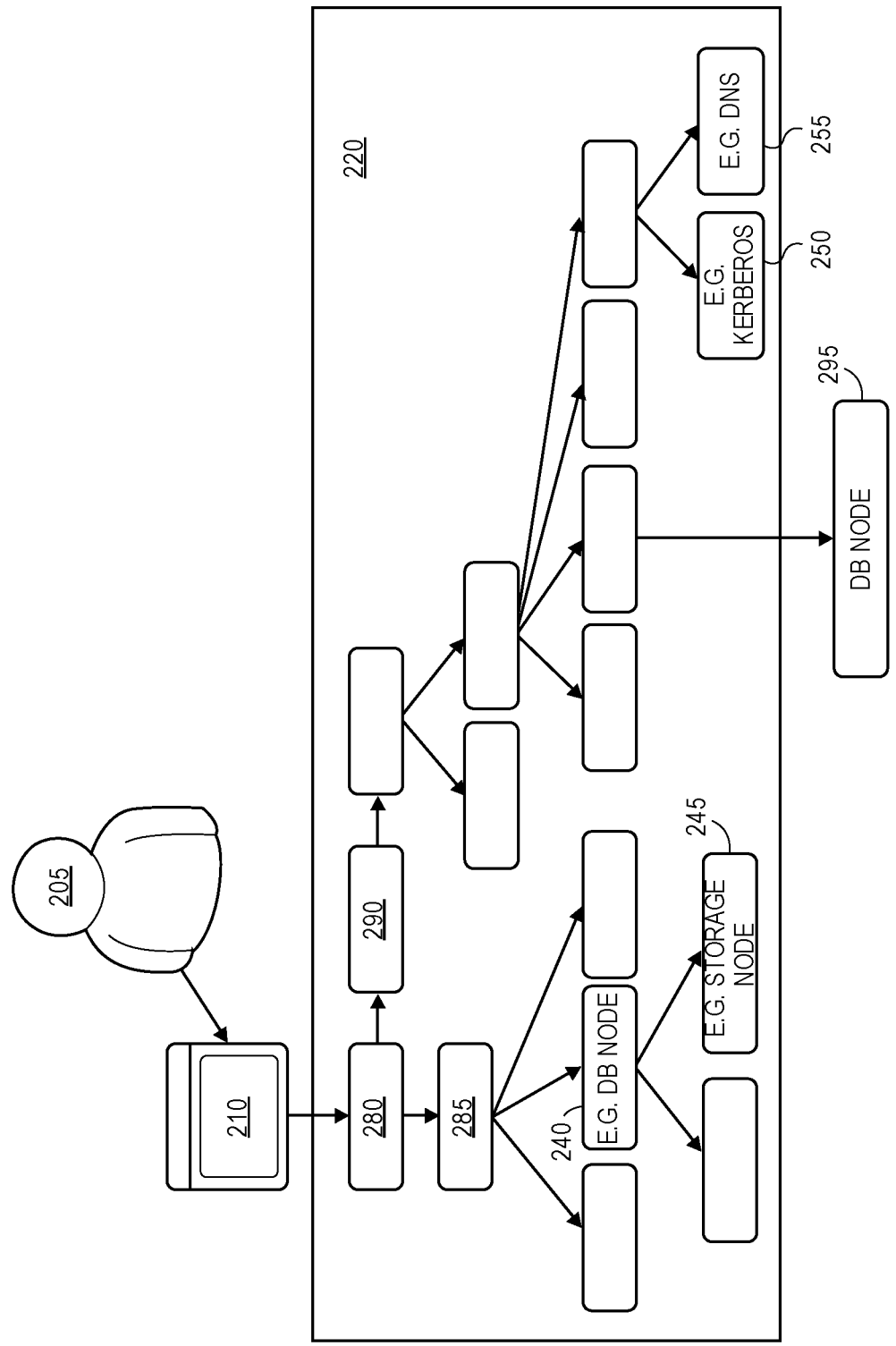
FIG. 2 is an example of an environment configured for a user session in which the user's device is configured to communicate with a complex solution made of various products and components that can be from many vendors and utilize many protocols.

In the following description, numerous specific details are set forth. However, embodiments of the invention may be practiced without these specific details. In other instances, well-known structures and techniques have not been shown in detail in order not to obscure the understanding of this description.

In the description that follows, various techniques and mechanisms are provided to utilize application context information to provide the database environment (e.g., DBMS, database server) with diagnostic information (e.g., trap files, diagnostic logs) and monitoring information (e.g., per-organization statistics, per-page-URI statistics). In one embodiment, these per-application contextual statistics/information can be provided via per-statement statistics functionality.

In the embodiments described below, mechanisms are provided that can accept an arbitrary set of solution and session context identifiers between components within an environment. These context identifiers can be included in diagnostic and/or monitoring features and/or files. In one embodiment, this can provide tracking of time within each component of a solution and encapsulating information about time spent at lower levels within the environment. In one embodiment, this can provide inclusion and/or encapsulation of lower-level error details (further encapsulated errors) within an error report sent to a higher-level component.

In one embodiment, each encapsulation can include enough context to identify the component in a solution (e.g. the role of the software, it's logical and possibly physical location in the data center). In one embodiment, logging or otherwise capturing time-spent stacks (for error and success outcomes) and error stacks (for error/failure outcomes) can be provided at the top of the stack.

FIG. 1 is a conceptual illustration of one embodiment of a set of context identifiers that can be utilized for monitoring and/or diagnostics purposes. In one embodiment, set of context identifiers/fields/files can be utilized to provide application context information to be utilized in monitoring and/or diagnostic operations.

In the example of FIG. 1, database set of context identifiers 100 includes several fields related to database functionality, for example, Request ID, Thread ID, User ID, etc. In one embodiment, selected fields from database set of context identifiers 100 are stored in a diagnostic log. In one embodiment, data from Thread ID field 110 in the set of context identifiers can also be stored as a process identifier in the diagnostic log. In one embodiment, data from Application IP address/port field 120 in database set of context identifiers 100 can also be stored in the diagnostic log. In one embodiment, application name 180 in database set of context identifiers 100 can also be store client application name 180.

While these are a few examples of the information available via database set of context identifiers 100 to be utilized in the diagnostic log, additional and/or different information can also be utilized. For example, if the host computing environment includes an application exchange/store where applications can be provided to various users, for example, from a third party.

The description that follows provides various embodiments in which the log mechanisms described above can be utilized to pass information between applications and databases. The techniques and architectures described herein are particularly useful in session-based environments in which connections between devices are temporary and can be complex.

FIG. 2 is an example of an environment configured for a user session in which the user's device is configured to communicate with a complex solution made of various products and components that can be from many vendors and utilize many protocols. In the example of FIG. 2, user 205 utilizes user device 210 to access one or more resources within environment 220, which can include any number of components and/or devices. Environment 220 can be, for example, an on-demand services environment, which can include one or more multitenant databases.

The techniques and architectures described herein are useful, for example, for performance tracking/evaluation and for error tracking/evaluation. The configuration of nodes and components is temporary. If, for example, a user experiences an error condition, some time will pass before that error information can be passed to system administrators (or others) who are assigned to correct the error condition. During this time environment 220 may change, which may make it difficult or impossible for the administrators to determine the cause of the error. As another example, a user may realize that environment 220 was operating more slowly that usual at some point in the past. If anything within environment 220 has changed, it may be impossible to determine the cause of the slowness.

In the example of FIG. 2, user 205 uses electronic device 210 to access environment 220. Electronic device 210 can be any type of device that allows user 205 to access environment 220. For example, electronic device 210 can be a laptop computer, a desktop computer, a tablet, a smartphone, a wearable computing device, etc. In one embodiment, electronic device 210 accesses environment 220 via a network (e.g., the Internet).

Environment 220 can include any number and type of components/node, but a few specific nodes are described for illustrative purposes. These examples are not intended to be limiting. In the example of FIG. 2, electronic device communicates with application server 280, which may provide access to other nodes (e.g., 285, 290). These nodes may provide the desired services, or may further interact with one or more additional nodes (e.g., database node 240 and storage node 245, authentication node 250, domain name server 255). In the example of FIG. 2, all of the nodes are within environment 220; however, one or more nodes may be outside of environment 220 (e.g. database node 295), but the information available about those nodes may be limited.

Figure 3:
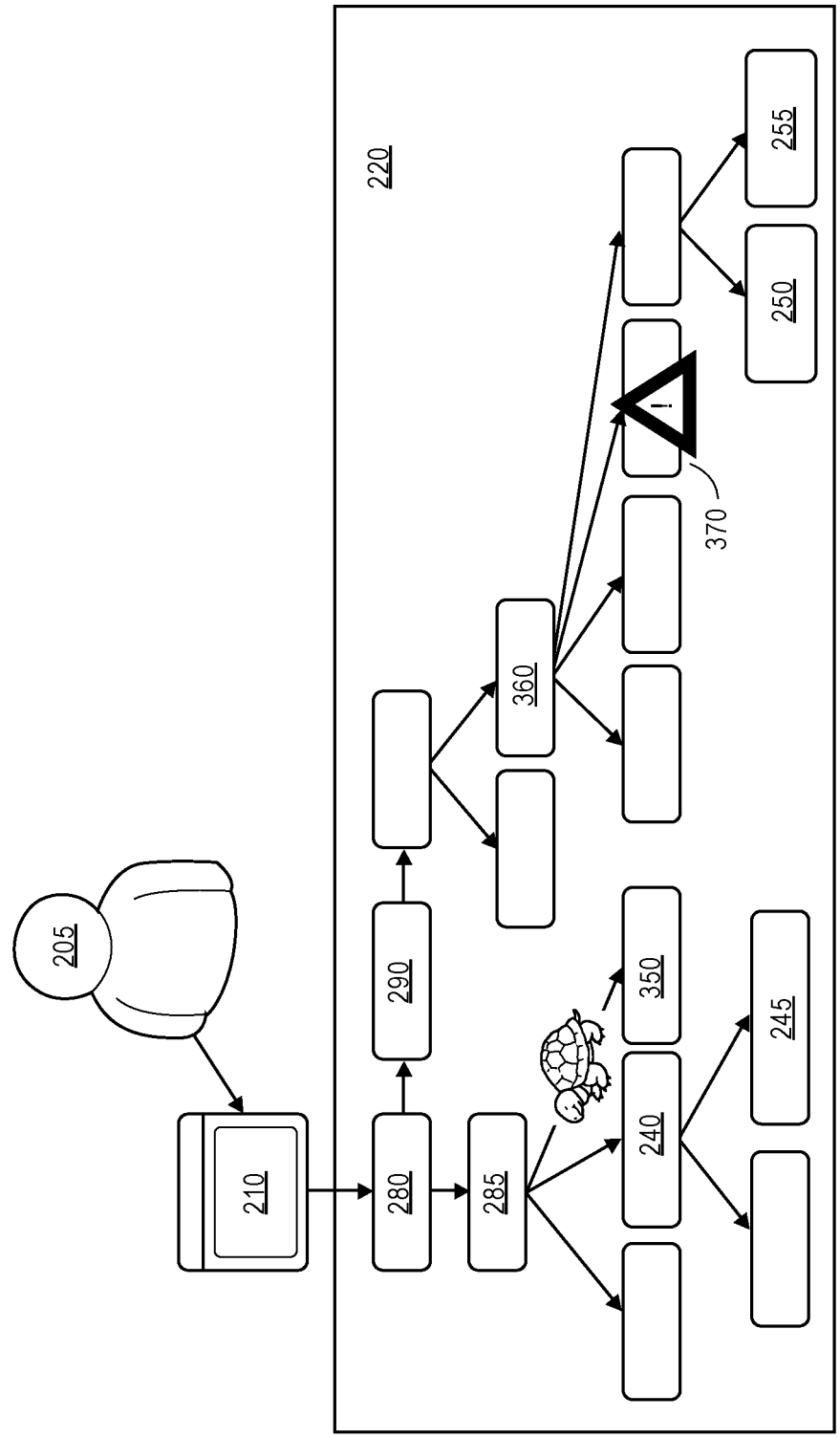
FIG. 3 is an example of an environment configured for the user session as in FIG. 2, but with components providing less than optimal performance.

FIG. 3 is an example of an environment configured for the user session as in FIG. 2, but with components providing less than optimal performance. As mentioned in the discussion of FIG. 2, user 205 may have experienced less than optimal performance from environment 220. In order to determine the cause of the sub-optimal performance and correct the condition, contextual information shared between components of environment 220 can be used.

In the example of FIG. 3, the connection between node 285 and node 350 was slow during the time in question. Also, node 370 was not functioning properly while interacting with node 360 during the time in question. Using traditional techniques, experts or specialists would be consulted for each node being evaluated. This is a time consuming and inefficient option. Described herein are techniques to pass down (and possibly up) correlation tokens and/or context identifiers that can be used to pass context, error and/or time-spent statistical information between nodes. These techniques can provide quick (possibly immediate) answers to performance conditions.

Using traditional techniques and tools there are several challenges. For example, different formats and context schemes make logging difficult. Proper correlation may be difficult or impossible. Some nodes may produce too much data for trace/logging tools. In various embodiments described herein, a common format, common schema and/or log/trace parser can be provided. Various embodiments can also provide formal correlation mechanisms.

Figure 4:
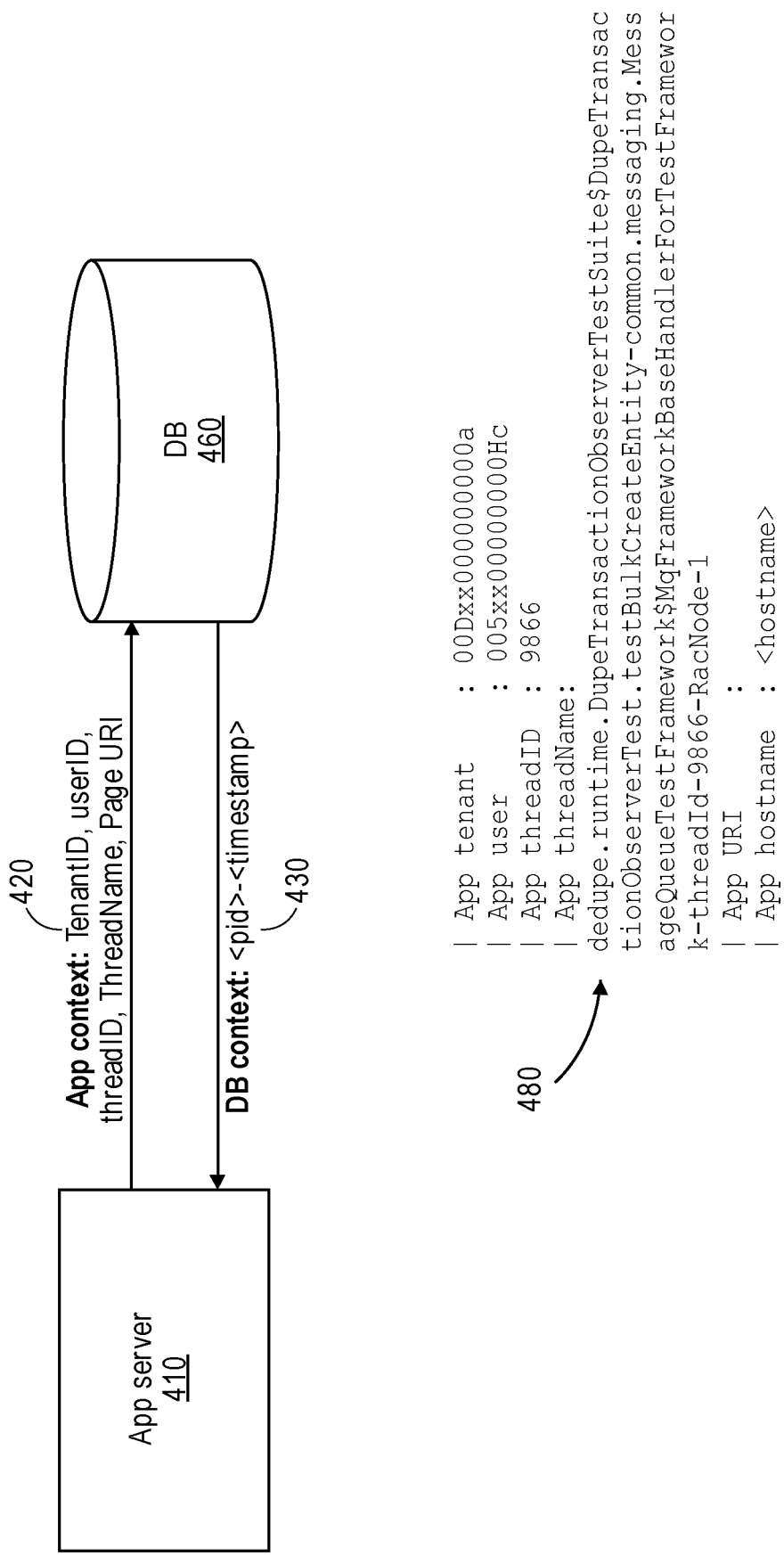
FIG. 4 is a conceptual illustration of exchange of context information between an app server and a database.

FIG. 4 is a conceptual illustration of exchange of context information between an app server and a database. While the example of FIG. 4 illustrates an app server communicating with a database, any type of node (e.g., as illustrated in FIG. 1 and/or FIG. 2) can be supported. Further, any number of nodes can also be supported. Embodiments for hierarchical structures are described in greater detail below.

In the example of FIG. 4, context information can be used to determine, for example, which database session is not behaving correctly. As another example, the context information can be used to determine which test/tenant/page/etc. is causing problems with the database. The context information described herein can be used to determine the cause of a wide range of conditions.

In one embodiment, app server 410 (or any other type of environment node) can provide app context 420 to database 460 (or any other type of environment node) as part of a transaction between app server 410 and database 460. In one embodiment, app context 420 includes a tenant identifier (tenantID), a user identifier (userID), a thread identifier (threadID), a thread name (ThreadName) and a page universal resource indicator (URI) for a page used to make the request associated with the transaction. In alternate embodiments, other and/or different information can be included in app context 420. App context 480 provides an example app context that can be used.

Similarly, database 460 provides database context information 430 for communications to app server 410. In one embodiment, database context 430 includes a process identifier (pid) and a time stamp. In alternate embodiments, other and/or different information can be included in database context 430.

Figure 5:
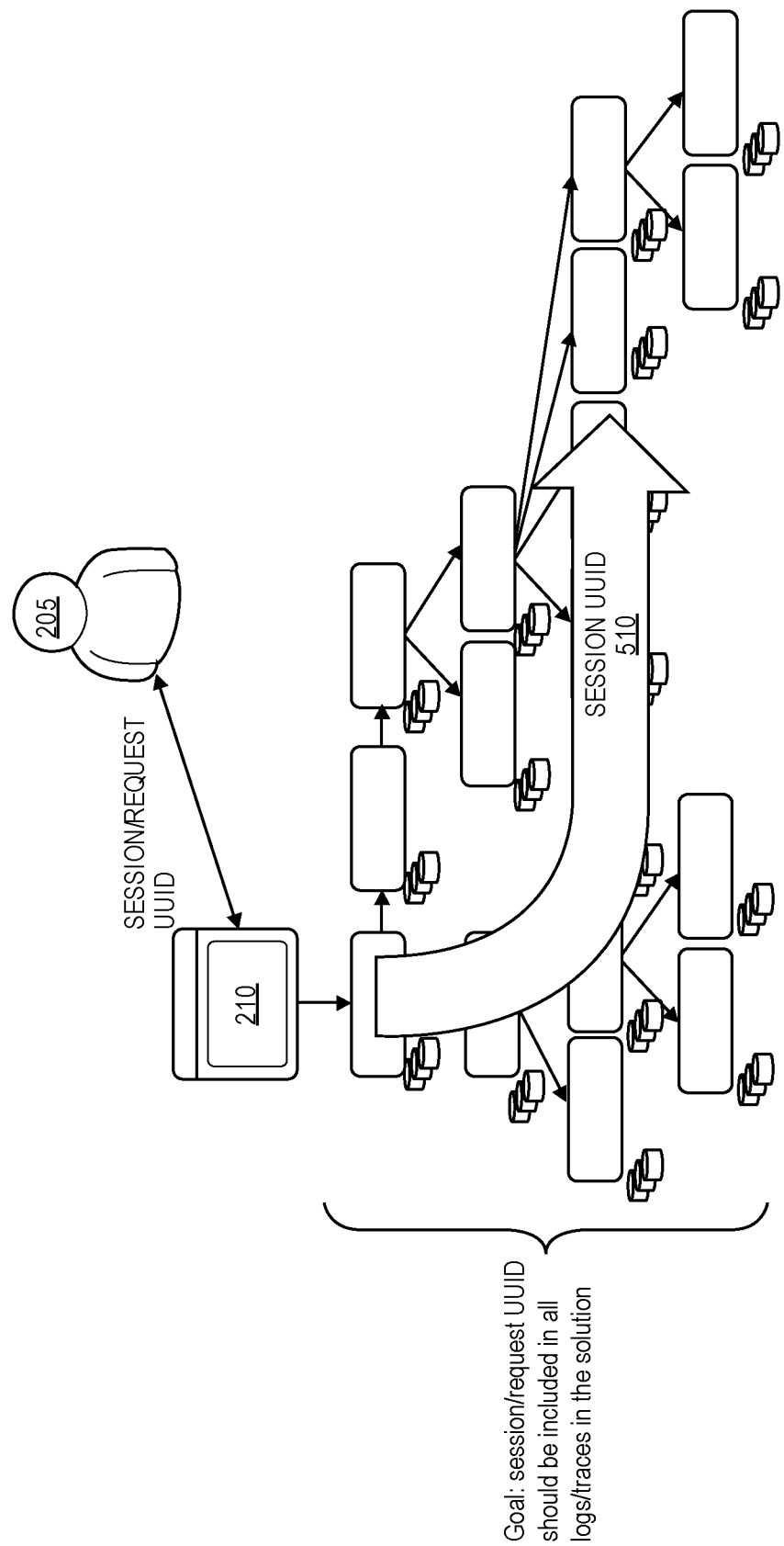
FIG. 5 is an example session utilizing context information and a session universal unique identifier (UUID).

FIG. 5 is an example session utilizing context information and a session universal unique identifier (UUID). In one embodiment, each session/request message includes session UUID 510 and UUID 510 is further included in transactions between nodes. By including the session UUID in all logs/traces, the context information can be more effectively correlated.

Figure 6:
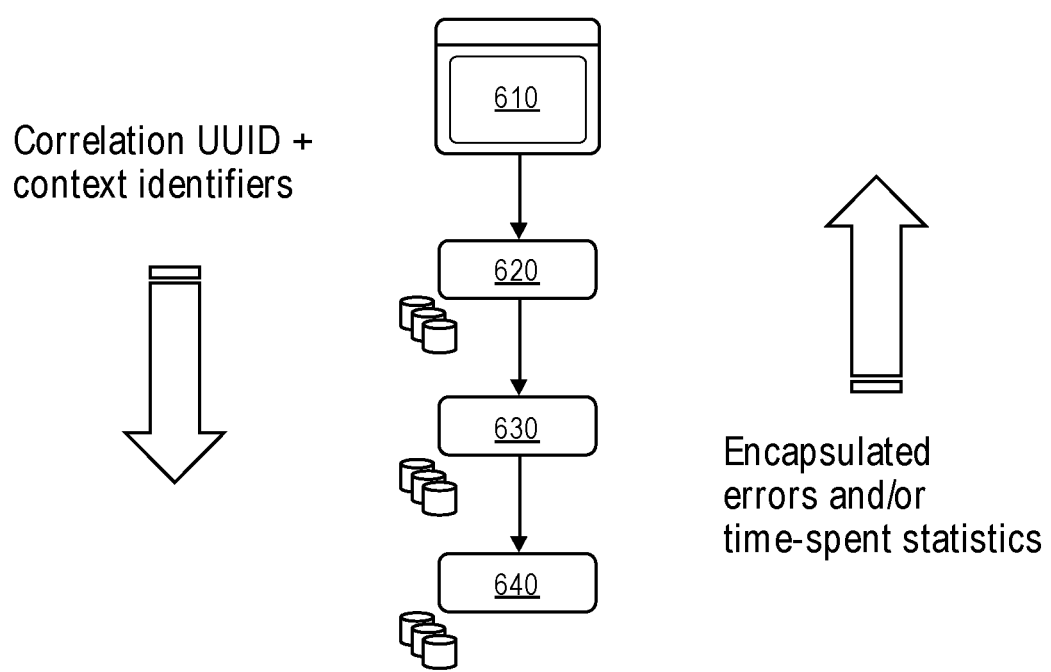
FIG. 6 is a conceptual illustration of one embodiment of a technique for encapsulating distributed diagnostic information.

FIG. 6 is a conceptual illustration of one embodiment of a technique for encapsulating distributed diagnostic information. In one embodiment, each component (e.g., 610, 620, 630, 640) passes down a global correlation UUID (see, for example, FIG. 5) and relevant context identifiers (see, for example, FIG. 4). In one embodiment, each component passes up error information (see, for example, FIG. 7) and/or time-spent statistical information (see, for example, FIG. 8).

In one embodiment, each component includes the correlation UUID and context identifiers from the calling component in its logs/trace/etc. In one embodiment, top components include the full chain of errors/statistics in its log/trace/etc. per request/session.

Figure 7:
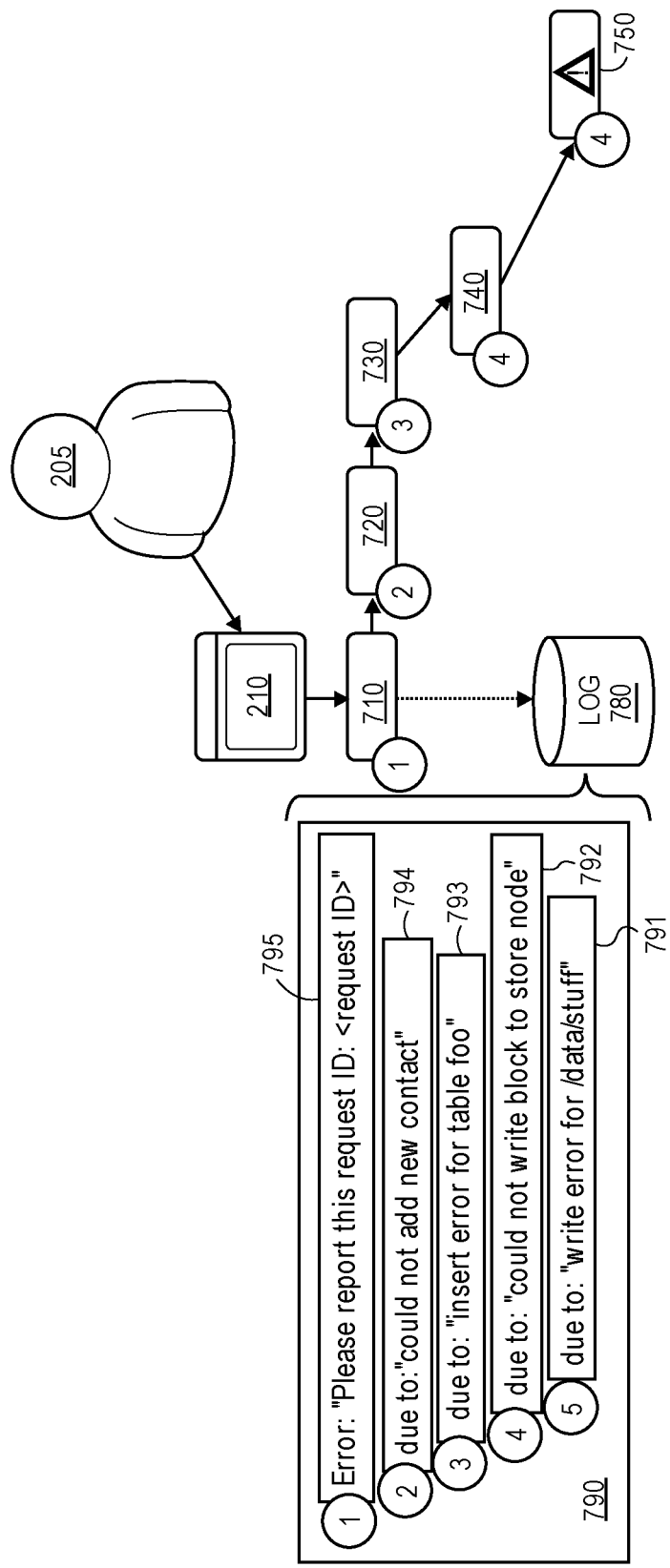
FIG. 7 is a conceptual illustration of one embodiment of encapsulated error messaging.

FIG. 7 is a conceptual illustration of one embodiment of encapsulated error messaging. With the global UUID, time-stamp and context identifiers, the relevant trace/log files can be identified as well as relevant records. In one embodiment, as illustrated in FIG. 7, each node can encapsulate lower level error information with its own error information to be passed back up. At any point (or in multiple points) in the process described with respect to FIG. 7, encapsulated error information can be included in an error log 790.

In the example of FIG. 7, node 750 experiences a write error. A write error message (e.g., "write error for/data/stuff") 791 can be passed to node 740. Node 740 can encapsulate the error message 791 with its own error message (e.g., "could not write block to store node) 792 to be passed to node 730. Node 730 can encapsulate error message 791 and error message 792 with its own error message (e.g., "insert error for table foo") 793 to be passed to node 720.

Node 720 can encapsulate error message 791, error message 792 and error message 793 with its own error message (e.g., "could not add new contact") 794 to be passed to node 710. Node 710 can encapsulate error message 791, error message 792, error message 793 and error message 794 with its own error message (e.g., "Please report this request ID: <request ID>") 795 to be displayed by electronic device 210 and/or stored in log 780. Thus, the final error message includes the chain of errors for all affected components.

FIG. 8 is a conceptual illustration of one embodiment of a technique for encapsulating time utilization information. The example of FIG. 8 utilizes the techniques discussed above to pass encapsulated time-spent statistics. Time-spent statistics for each component can provide a complete solution level view of time spend including, for example, time-spent on each network hop. At any point (or in multiple points) in the process described with respect to FIG. 8, encapsulated time utilization information can be included in an error (or other type of) log 890.

In the example of FIG. 8, node 850 can gather time-spent information for activities performed on node 850 corresponding to a session/request. This time-spent information can be for one or more categories of activities (e.g., network hops, memory/disk accesses, processor time, wait time). Time-spent information 891 can be passed to node 840. Node 840 can encapsulate the time-spent information 891 with its own time-spent information 892 to be passed to node 830. Node 830 can encapsulate lower level time-spent information with its own time-spent information 893 to be passed to node 820.

Node 820 can encapsulate lower level time-spent information with its own time-spent information 894 to be passed to node 810. Node 810 can encapsulate lower level time-spent information with its own time-spent information 895 to be displayed by electronic device 210 and/or stored in log 880. Thus, the final time-spent includes the time-spent information for all components.

In one embodiment, with minimum participation from the nodes, each node returns time spent within the node and on the network. In one embodiment, with full leaf participation, each node returns broken down time spent within the node, time spent on the network and time spent for external dependencies (e.g., input/output activity, DNS activity). In one embodiment, with full branch participation, each node returns broken down time spent within the node, time spent on the network, time spent for external dependencies and encapsulated (and aggregated) statistics from all participating components.

Figure 9:
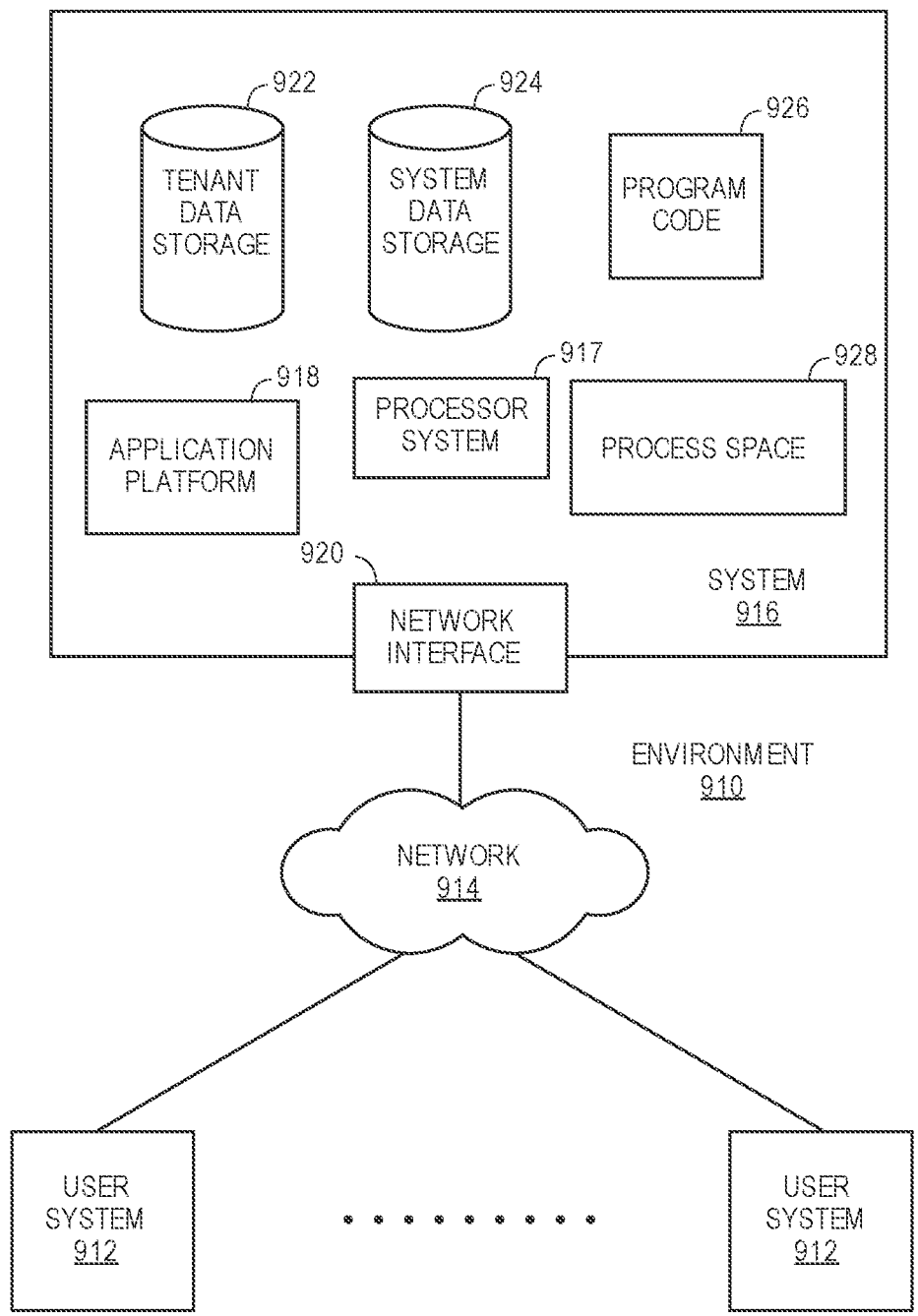
FIG. 9 illustrates a block diagram of an environment where an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
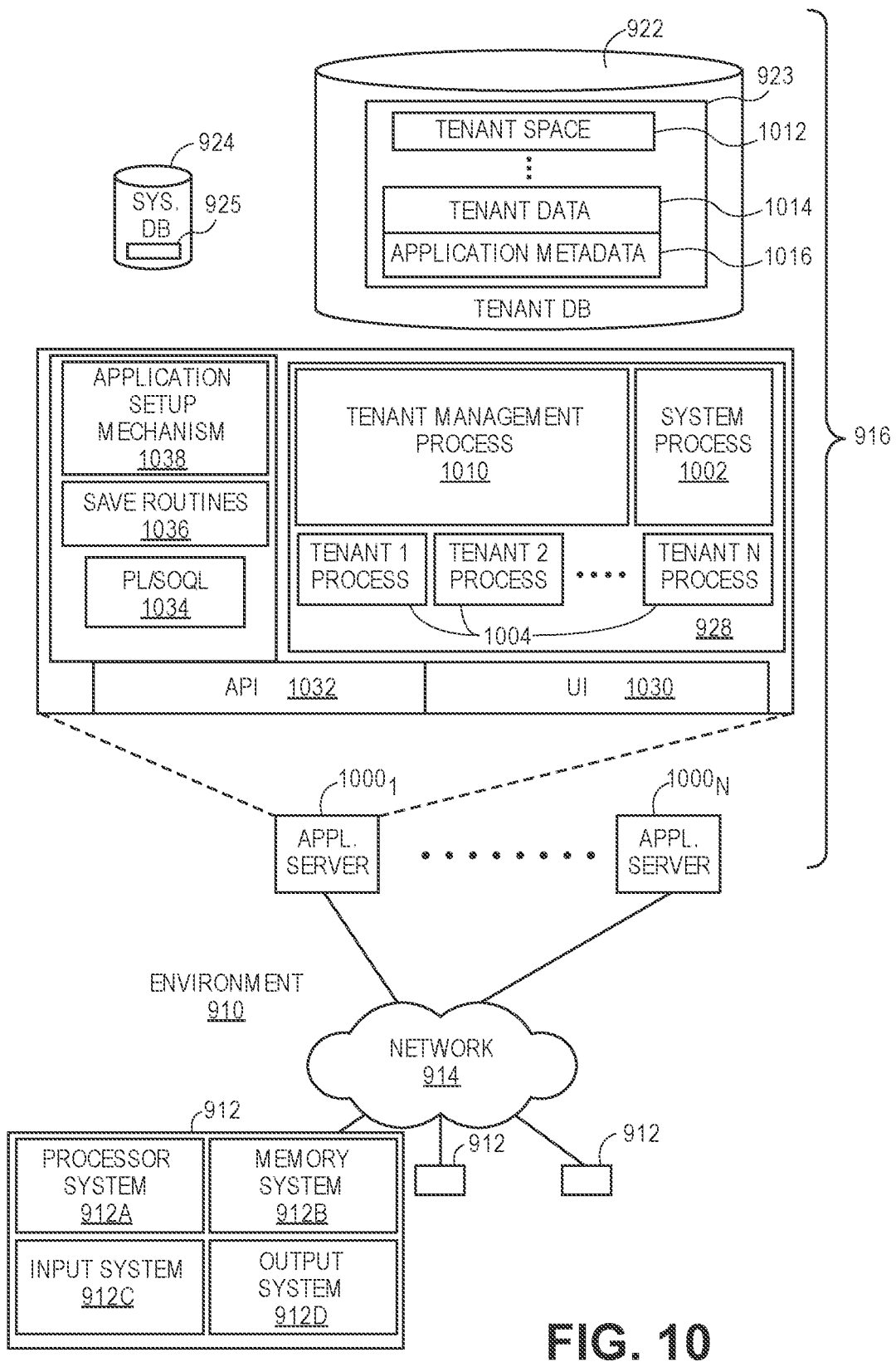
FIG. 10 illustrates a block diagram of an environment where an on-demand database service might be used.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. In an environment having at least one database and at least one application, a method comprising:
   generating, by the environment, one or more sets of database identifiers corresponding to one or more events that occur within the database, wherein the one or more sets of database identifiers have at least one application field to store diagnostic data;
   sending, from the environment to the application, a session identifier corresponding to a group of diagnostic operations;
   sending, from the application, information to be stored in the at least one application field with the session identifier;
   generating database logs and application logs comprising the one or more events being co-related by at least the session identifier.

2. The method of claim 1 wherein the correlating the database logs and the application logs comprises at least sending an application stack from the application to the environment.

3. The method of claim 2 wherein the correlating database logs and application logs further comprises at least sending a stack trace from the environment to the application.

4. The method of claim 2 wherein the application stack further includes encapsulated diagnostic information from multiple levels within the environment.

5. The method of claim 2 wherein the application stack further includes encapsulated time-spent information from multiple levels within the environment.

6. The method of claim 1 wherein the database identifiers provide context information to identify a logical positioning within the environment of a corresponding component.

7. The method of claim 1 wherein the database identifiers provide error or time-spent statistical information.

8. A non-transitory computer-readable medium having stored thereon instructions that, when executed by one or more processors, cause the one or more processors, in an environment having at least one database and at least one application, to
- generate, by the environment, one or more sets of database identifiers corresponding to one or more events that occur within the database, wherein the one or more sets of database identifiers have at least one application field to store diagnostic data;
- send, from the environment to the application, a session identifier corresponding to a group of diagnostic operations;
- send, from the application, information to be stored in the at least one application field with the session identifier;
- generate database logs and application logs comprising the one or more events being co-related by at least the session identifier.

9. The non-transitory computer-readable medium of claim 8 wherein the correlating the database logs and the application logs comprises at least sending an application stack from the application to the environment.

10. The non-transitory computer-readable medium of claim 9 wherein the correlating database logs and application logs further comprises at least sending a stack trace from the environment to the application.

11. The non-transitory computer-readable medium of claim 9 wherein the application stack further includes encapsulated diagnostic information from multiple levels within the environment.

12. The non-transitory computer-readable medium of claim 9 wherein the application stack further includes encapsulated time-spent information from multiple levels within the environment.

13. The non-transitory computer-readable medium of claim 8 wherein the database identifiers provide context information to identify a logical positioning within the environment of a corresponding component.

14. The non-transitory computer-readable medium of claim 8 wherein the database identifiers provide error or time-spent statistical information.

15. A system comprising:
- a physical memory device;
- one or more hardware processors coupled with the physical memory device, the one or more hardware processors configurable to:
- generate, by the environment, one or more sets of database identifiers corresponding to one or more events that occur within the database, wherein the one or more sets of database identifiers have at least one application field to store diagnostic data;
- send, from the environment to the application, a session identifier corresponding to group of diagnostic operations;
- send, from the application, information to be stored in the at least one application field with the session identifier;
- generate database logs and application logs comprising the one or more events being co-related by at least the session identifier.

16. The system of claim 15 wherein the correlating the database logs and the application logs comprises at least sending an application stack from the application to the environment.

17. The system of claim 16 wherein the correlating database logs and application logs further comprises at least sending a stack trace from the environment to the application.

18. The system of claim 16 wherein the application stack further includes encapsulated diagnostic information from multiple levels within the environment.

19. The system of claim 16 wherein the application stack further includes encapsulated time-spent information from multiple levels within the environment.

20. The system of claim 15 wherein the database identifiers provide context information to identify a logical positioning within the environment of a corresponding component.

* * * * *